(12) United States Patent
Taubman

(10) Patent No.: US 6,760,482 B1
(45) Date of Patent: Jul. 6, 2004

(54) METHOD FOR VISUAL OPTIMISATION OF EMBEDDED BLOCK CODES TO EXPLOIT VISUAL MASKING PHENOMENA

(75) Inventor: David Scott Taubman, New South Wales (AU)

(73) Assignee: Unisearch Limited (AU)

( * ) Notice: Subject to any disclaimer, the term of this patent is extended or adjusted under 35 U.S.C. 154(b) by 0 days.

(21) Appl. No.: 09/913,908

(22) PCT Filed: Feb. 18, 2000

(86) PCT No.: PCT/AU00/00115

§ 371 (c)(1),
(2), (4) Date: Mar. 1, 2002

(87) PCT Pub. No.: WO00/49570

PCT Pub. Date: Aug. 24, 2000

(30) Foreign Application Priority Data

Feb. 19, 1999 (AU) .............................................. PP 8775
Feb. 26, 1999 (AU) .............................................. PP 8934
Jul. 13, 1999 (AU) ............................................. PQ 1612

(51) Int. Cl.$^7$ .................................................. G06K 9/46
(52) U.S. Cl. ........................................ 382/240; 382/248
(58) Field of Search .................................. 382/232, 239, 382/240, 248, 250, 251, 253; 358/426.02, 426.04, 426.11; 348/404.1, 408.1, 420.1; 375/240.02, 240.03, 240.18, 240.19, 240.2, 240.24

(56) References Cited

U.S. PATENT DOCUMENTS

| | | | |
|---|---|---|---|
| 5,526,052 A | * 6/1996 | Ar .................................. | 348/405 |
| 5,682,442 A | * 10/1997 | Johnston et al. ............. | 382/239 |
| 5,734,755 A | 3/1998 | Ramchandran et al. ..... | 382/250 |
| 5,990,957 A | 11/1999 | Ryoo ............................ | 348/405 |
| 6,212,302 B1 | * 4/2001 | Honsinger et al. .......... | 382/232 |
| 6,236,756 B1 | * 5/2001 | Kimura et al. ............... | 382/239 |
| 6,529,631 B1 | * 3/2003 | Peterson et al. ............. | 382/232 |
| 6,625,321 B1 | * 9/2003 | Li et al. ....................... | 382/239 |

FOREIGN PATENT DOCUMENTS

| | | | | |
|---|---|---|---|---|
| AU | 708489 B2 | 4/1999 | ............. | H03M/7/30 |
| FR | 2 755 817 A1 | * 5/1998 | ............. | H04N/7/26 |
| WO | WO98/30979 A1 | 7/1998 | ............. | G06T/9/00 |

OTHER PUBLICATIONS

Ke Shen and Edward Delp, "Color Image Compression Using an Embedded Rate Scalable Approach"; *ICIP '97*, vol. 5, Oct. 26–29, 1997.
Ingo Höntsch, Lina Karam and Robert Safranek, "A Perceptually Tuned Embedded Zerotree Image Coder", *ICIP '97*, Oct. 26–29, 1997.
Ingo Höntsch and Lina Karam, "APIC: Adaptive Perceptual Image Coding Based on Subband Decomposition With Locally Adaptive Perceptual Weighting", *ICIP '97*, vol. 1, Oct. 26–29, 1997.
"citation d", CDVMR–Document No. PR–98–95 "JPEG2000 Status and Activities (Pearlman et al.) Dec. 9, 1988. See slide 19 entitled VM–A Characteristics. Document available at http://www.ecse.rpi.edu/CNGV/publications/1998_PR/JPEG2_stat.pdf (attachment to Australia International Property Office Patents–Trademarks–Designs Examiner's first report on patent application No. 27842/00 by Unisearch Limited", Jan. 16, 2003, Woden ACT 2606, Australia).

* cited by examiner

*Primary Examiner*—Andrew W. Johns
(74) *Attorney, Agent, or Firm*—Dority & Manning

(57) ABSTRACT

A method for lossy compression of images reduces visual distortion for a given compressed bit-rate or, equivalently, requires a lower bit-rate for a given level of visual distortion. An image is decomposed using a space-frequency transform and frequency bands are then partitioned into small blocks. The blocks are independently quantized and coded using an embedded block coder, so that each block bit-stream contains a large number of finely spaced truncation points. A visual distortion measure is computed for each block at each truncation point, where the metric is sensitive to masking properties of the Human Visual System. The distortion values and bit-stream lengths corresponding to each block's truncation point are used to optimise overall visual distortion at one or more target bit-rates or to minimise the bit-rate corresponding to one or more target visual distortion levels. A computationally and memory efficient procedure is described for computing the visual distortion measure for each block's truncation point, within each frequency band, as required by the subject compression system.

29 Claims, 1 Drawing Sheet

METHOD FOR VISUAL OPTIMISATION OF EMBEDDED BLOCK CODES TO EXPLOIT VISUAL MASKING PHENOMENA

PRIORITY CLAIM

This application claims priority to Application Nos. PP 8775 filed in Australia on Feb. 19, 1999, PP 8934 filed in Australia on Feb. 26, 1999, PQ 1612 filed in Australia on Jul. 13, 1999, and PCT International Application No. PCT/AU00/00115 filed on Feb. 18, 2000, and which are incorporated herein by reference.

FIELD OF THE INVENTION

The present invention relates to the lossy compression of still images and, more particularly, to an improved method for assigning bits to different spatial and frequency portions of the compressed image so as to maximise perceived visual quality.

BACKGROUND OF THE INVENTION

Conventional image compression systems, such as that represented by the well-known baseline JPEG standard, suffer from a number of problems of which the following three are notable.

1) They are unable to exploit visual masking and other properties of the Human Visual System (HVS) which vary spatially with image content. This is because the quantization parameters used by these algorithms are constant over the extent of the image. As a result, images are unable to be compressed as efficiently as might be expected if visual masking were taken into account.

2) To achieve a target bit-rate or visual quality, the image must be compressed multiple times, while varying one or more of the quantization parameters in an iterative fashion. This is known as the rate-control problem and it enters into many practical image compression applications, including the compression of digital camera images and page compression to save memory within printers, scanners and other such peripheral devices.

3) The target bit-rate and desired viewing resolution must be known prior to compression. By contrast, for many applications, a scalable bit-stream is highly desirable. A scalable bit-stream is one which may be partially transmitted or decompressed so as to reconstruct the image with lower quality or at a lower resolution, such that the quality of the reconstructed image is comparable to that which would have been achieved if the relevant bit-rate and resolution were known when the image was compressed. Obviously, this is a desirable property for compressed image databases, which must allow remote clients access to the image at the resolution and bit-rate (i.e. download time) of their choice. Scalability is also a key requirement for robust transmission of images over noisy channels. The simplest and most commonly understood example of a scalable bit-stream is a so-called "progressive" bit-stream. A progressive bit-stream has the property that it can be truncated to any length and the quality of the reconstructed image should be comparable to that which could have been achieved if the image had been compressed to the truncated bit-rate from the outset. Scalable image compression clearly represents one way of achieving non-iterative rate-control and so addresses the concerns of item 2) above.

A number of solutions have been proposed to each of these problems. The APIC image compression system (H öntsch and Karam, "APIC: Adaptive Perceptual Image Coding Based on Sub-band Decomposition with Locally Adaptive Perceptual Weighting," *International Conference on Image Processing*, vol. 1, pp. 37–40, 1997) exploits visual masking in the Wavelet transform domain, through the use of an adaptive quantizer, which is driven by the causal neighbourhood of the sample being quantized, consisting of samples from the same sub-band. The approach has a number of drawbacks: it is inherently not scalable; iterative rate-control is required; and the masking effect must be estimated from a causal neighbourhood of the sample being quantized, in place of a symmetric neighbourhood which would model the HVS more accurately. On the other hand, a variety of solutions have been proposed to the second and third problems. Some of the more relevant examples are the SPIHT (A. Said and W. Pearlman, "A New, Fast and Efficient Image Codec based on Set Partitioning in Hierarchical Trees," *IEEE Trans. on Circuits and Systems for Video Technology*, vol. 6, no. 3, pp. 243–250, June 1996) and EBCOT (D. Taubman, "EBCOT: Embedded Block Coding with Optimised Truncation," ISO/IEC JTC 1/SC 29/WG1 N1020R, Oct. 21, 1998.) image compression methods. These both produce highly scalable bit-streams and directly address the rate-control problem; however, they focus on minimising Mean Squared Error (MSE) between the original and reconstructed images, rather than minimising visual distortion. Some attempts have been made to exploit properties of the HVS within the context of SPIHT and other scalable compression frameworks; however, these approaches focus on spatially uniform properties such as the Contrast Sensitivity Function (CSF), and are unable to adapt spatially to exploit the important phenomenon of visual masking. The compression system proposed by Mazzarri and Leonardi (A. Mazzarri and R. Leonardi, "Perceptual Embedded Image Coding using Wavelet Transforms," *International Conference on Image Processing*, vol. 1, pp. 586–589, 1995.) is an example of this approach. Also worth mentioning here is the method proposed by Watson (A B Watson, "DCT Quantization Matrices Visually Optimized for Individual Images," *Proceedings of the SPIE*, vol. 1913, pp. 202–216, 1993.) for optimising quantization tables in the baseline JPEG image compression system. Although this method is restricted to space invariant quantization parameters and non-scalable compression, by virtue of its reliance on the baseline JPEG compression standard, it does take visual masking and other properties of the HVS into account in designing a global set of quantization parameters. The visual models used in the current invention are closely related to those used by Watson and those used in APIC.

Embedded Block Coding

Embedded block coding is a method of partitioning samples from the frequency bands of a space frequency representation of the image into a series of smaller blocks and coding the blocks such that the bit stream in each block can be truncated at a length selected to provide a particular distortion level. To achieve embedded block coding, the image is first decomposed into a set of distinct frequency bands using a Wavelet transform, Wavelet packet transform, Discrete Cosine Transform, or any number of other space-frequency transforms which will be familiar to those skilled in the art. The basic idea is to further partition the samples in each band into smaller blocks, which we will denote by the symbols, $B_1, B_2, B_3, \ldots$. The particular band to which each of these blocks belongs is immaterial to the current discussion. The samples in each block are then coded independently, generating a progressive bit-stream for each block. $B_i$, which can be truncated to any of a set of distinct lengths, $R_i^1, R_i^2, \ldots, R_i^{N_i}$, prior to decoding. Efficient block coding engines, which are able to produce a finely gradated set of truncation points, $R_i^n$, such that each truncated bit-stream represents an efficient coding of the small independent block of samples, $B_i$, have been introduced only recently as part of the EBCOT image compression system. A discussion of the techniques involved in generating such embedded block bit-streams is inappropriate and unnecessary here, since the present invention does not rely upon the specific mechanism used to code each block of samples, but only upon the existence of an efficient, fine embedding, for independently coded blocks of samples from each frequency band.

The motivation for considering embedded block coding is that each block may be independently truncated to any desired length in order to optimise the trade-off between the size of the overall compressed bit-stream representing the image and the distortion associated with the image which can be reconstructed from this bit-stream. In the simplest incarnation of the idea, each block bit-stream is truncated to one of the available lengths, $R_i^n$, in whatever manner is deemed most appropriate, after which the truncated bit-streams are concatenated in some pre-determined order, including sufficient auxiliary information to identify the truncation point, $n_i$, and length, $R_i^{n_i}$, associated with each block. Evidently, this provides an elegant solution to the rate-control problem described above. In more sophisticated incarnations of the idea, the overall compressed bit-stream might be organised into successively higher quality "layers", where each layer contains incremental contributions from the embedded bit-stream of each block, such that layers 1 through l together contain the initial $R_i^{n_i^l}$ bytes from code-block $B_i$, for each l=1,2,3, . . . . The truncation points, $n_i^l$, associated with each block and each layer may be independently selected, subject only to the requirement that $n_i^l \geq n_i^{l-1}$, which is not restrictive in practice. The EBCOT image compression system provides a mechanism for efficiently embedding a large number of layers in a single compressed image bit-stream, thereby generating a highly scalable representation of the image. In addition to scalability, bit-streams generated in this way possess important properties, including the ability to decompress arbitrary portions of only those code-blocks which are required to reconstruct a limited spatial region within the image. This is identified as a "random access" property.

Embedded block coding also has important consequences for keeping implementation memory requirements down. This is because the space-frequency transform itself generally has localised memory requirements and the block coding process is also highly localised. Even though all blocks in the image (or at least a large fraction of them) must generally be considered to optimally select the truncation points, $n_i^l$, for each block, $B_i$, in each layer, l, these decisions may be made after the code-blocks have been compressed so that the impact on implementation memory is limited to the compressed representation of each block via its embedded bit-stream, together with some summary information which might be used to assist in determining good truncation points. Together, this information is generally significantly smaller than the original image.

Rate-Distortion Optimisation

In considering rate distortion optimisation we must consider methods for minimising overall image distortion, subject to a constraint on the overall bit-rate, and for minimising bit-rate subject to a constraint on the overall image distortion. The optimisation task is greatly simplified by considering only "additive" distortion measures, where the overall distortion, D, may be written as a sum of independent contributions, $D_i$, from each of the code-blocks, $B_i$. Under these conditions, let $D_i^n$, denote the contribution to the overall image distortion from code-block $B_i$, when its embedded representation is truncated to length $R_i^n$. The objective, then, is to find the set of truncation points, $n_i$, which minimise $$D = \sum_i D_i^{n_i}$$

subject to $R \leq R_{max}$, where $R_{max}$ is the bit-rate constraint and $$R = \sum_i R_i^{n_i}$$

is the overall bit-rate.

It is common to use Mean Squared Error (MLSE) as the distortion measure, primarily because MSE satisfies the additivity property in equation 1 reasonably well. Specifically, let $w_{i,k}$ denote the basis function associated with sample $s_i[k]$ of block $B_i$ in the space-frequency transform, so that the original image may be recovered as $$\sum_i \sum_k w_{i,k} \cdot s_i[k]$$

Now define $$\hat{D}_i^n = \|w_i\|^2 \sum_k (\hat{s}_i^n[k] - s_i[k])^2$$

where $\hat{s}_i^n[k]$ denotes the distorted samples reconstructed from the bit-stream after truncating block $B_i$'s embedded representation to length $R_i^n$, and $\|w_i\|$ denotes the L2-norm of the basis functions (All basis functions, $w_{i,k}$, for block $B_i$ are shifted versions of one another since the block's samples all belong to the same frequency band of the space-frequency transform. Consequently, they must all have the same L2-norm) associated with each of the samples in block $B_i$. Then, setting $D_i^n = \hat{D}_i^n$, it is not hard to show that the additivity requirement of equation 1 is satisfied with D denoting MSE, provided either the basis functions, $w_{i,k}$, are all orthogonal to one another, or the individual sample distortions, $\hat{s}_i^n[k] - s_i[k]$, are unco-related. In practical applications, neither of these assumptions might be strictly true, but the basis functions are often approximately orthogonal.

Now it is not hard to see that any set of truncation points, $\{n_{i,\lambda}\}$, which minimises $$(D_\lambda + \lambda R_\lambda) = \sum_i \left( D_i^{n_{i,\lambda}} + \lambda R_i^{n_{i,\lambda}} \right)$$

for some $\lambda$, is optimal in the sense that the distortion cannot be reduced without also increasing the overall bit-rate. Thus, if a value of $\lambda$ can be found such that the truncation points which minimise equation 4 yield the target rate, $R_\lambda = R_{max}$, exactly, then this set of truncation points must be an optimal solution to the rate-distortion optimisation problem. In general, however, it will not be possible to find a value of $\lambda$ for which $R_\lambda = R_{max}$, since there are only finitely many code-blocks with a finite number of available truncation points. Nevertheless, if the code-blocks are relatively small and each block offers a finely embedded bit-stream, it is sufficient in practice to find the smallest value of $\lambda$ such that $R_\lambda \leq R_{max}$. Similarly, if one is interested in minimising the overall bit-rate subject to some constraint on the distortion, it is sufficient in practice to find the smallest value of $\lambda$ such that $D_\lambda \leq D_{max}$.

It can be demonstrated that the determination of the truncation points, $n_i^\lambda$, which minimise the expression in equation 4 may be performed very efficiently, based on a small amount of summary information collected during the generation of each code-block's embedded bit-stream. It is clear that this minimisation problem separates into the independent minimisation of $D_i^{n_{i,\lambda}} + \lambda R_i^{n_{i,\lambda}}$, for each block, $B_i$. An obvious algorithm for finding each truncation point, $n_i^\lambda$, is as follows:

Initialize $n_{i,\lambda}=0$ (i.e. no information included for the block)
For j=1,2,3, ...
Set $\Delta R_i^j = R_i^j - R_i^{n_{i,\lambda}}$ and $\Delta D_i^j = D_i^{n_{i,\lambda}} - R_i^j$
If $\Delta D_i^j / \Delta R_i^j > \lambda$ then set $n_i = j$ Since this algorithm might need to be executed for many different values of $\lambda$, it makes sense to first identify the subset, $N_i$, of candidate truncation points. Let $j_1 < j_2 < \ldots$ be an enumeration of the elements of $N_i$ and let the rate-distortion "slopes" for each element be given by $S_i^{j_k} = \Delta D_i^{j_k} / \Delta R_i^{j_k}$, where $\Delta R_i^{j_k} = R_i^{j_k} - R_i^{j_{k-1}}$ and $\Delta D_i^{j_k} = D_i^{j_{k-1}} - D_i^{j_k}$. Evidently, the slopes must be strictly decreasing, for if $S_i^{j_{k+1}} \geq S_i^{j_k}$ then the truncation point, $j_k$, could never be selected by the above algorithm, regardless of the value of $\lambda$, and so $N_i$ would not be the set of candidate truncation points. When restricted to the set, $N_i$, of truncation points whose slopes are strictly decreasing, the algorithm reduces to the trivial selection, $n_{i,\lambda} = \max\{j_k \in N_i | S_i^{j_k} > \lambda\}$ so it is clear that strictly decreasing slope is a sufficient as well as a necessary condition for the set of candidate truncation points.

In a typical implementation of these rate-distortion optimisation ideas within the context of embedded block coding, the set $N_i$ is determined using a conventional convex hull analysis, immediately after the bit-stream for $B_i$ has been generated. The truncation lengths, $R_i^{j_k}$, and slopes, $S_i^{j_k}$, are stored in a compact form along with the embedded bit-stream until all code-blocks have been compressed, at which point the search for $\lambda$ and $\{n_{i,\lambda}\}$, which minimise distortion subject to a maximum bit-rate (or minimise bit-rate subject to a maximum distortion) proceeds. The search may be repeated for each bit-stream layer in the case of the more complex bit-stream organisations described previously.

SUMMARY OF THE INVENTION

According to a first aspect the present invention consists in a method of compressing a digital image including the steps of:

a) Decomposing the image into a set of distinct frequency bands using a space frequency transform;

b) Partitioning the samples in each frequency band into code blocks;

c) For each code-block, generating an embedded bit-stream to represent the contents of the respective code block;

d) Determining a rate-distortion optimal set of truncation points, $n_i^l$ for each code-block, $B_i$, and each quality layer, l, of which there may be only one subject to a constraint on the overall bit-rate or distortion for the layer in a manner which is sensitive to the masking property of the Human Visual System (HVS); and e) Storing the embedded bit-streams for each code-block.

Preferably, in the compression method, the code-block truncation points are selected according to a rate-distortion optimisation criterion, using a distortion measure which is sensitive to masking in the HVS.

Preferably also, contributions to the distortion measure from each sample in a code block are weighted as a function of a neighbourhood of samples surrounding the respective sample. In the preferred embodiment the distortion measure is a weighted sum of the squared errors taken at each sample, and the weighting function is a function of the magnitudes of the samples in the respective neighbourhood of samples. To ease the computational burden, the weighting function may be held constant over a sub-block of samples, which is preferably selected to have dimensions no larger than the full size of the respective code block. The samples that are averaged by the weighting function are preferably taken only from within the sub-block, however in some embodiments the samples that are averaged may also include samples taken from outside the sub-block.

In the preferred embodiment, the method is performed by a coding engine using an algorithm which passes through the block multiple times for every bit-plane in the magnitude of the samples, starting with the most significant bit and working down to the least significant bit, the truncation points being identified with the completion of each coding pass. In the preferred embodiment, for each code-block, $B_i$, the size of the bit-stream, $R_i^n$, at each truncation point, n, and the change in visual distortion, $\Delta D_i^n$, between truncation points n−1 and n are determined and this information is supplied to a convex hull analysis system, which determines the set of truncation points, $N_i = \{n_1, n_2, \ldots\}$, which are candidates for the rate-distortion optimisation algorithm, as well as respective monotonically decreasing rate-distortion slopes $S_i^{n_j}$. Preferably also, summary information, $N_i$, $R_i^n$ and $S_i^n$, is stored along with the embedded bit streams for each code block, the storing process taking place until sufficient information has been stored to enable truncation points to be determined for each code-block.

In the preferred embodiment, this information is saved until all code-blocks in the image have been compressed; however, memory constrained applications might choose to begin making truncation decisions before this point, subject to the available working memory.

In the preferred embodiment, the rate-distortion optimal set of truncation points $n_i^l$ are determined for each code with a plurality of layers, each layer targeted to a distinct bit-rate or distortion level, with each layer targeting successively higher image quality such that for each successive layer l there are $n_i^l \geq n_i^{l-1}$ truncation points, and the final scalable image bit-stream is formed by including $R_i^{n_i l} - R_i^{n_i l-1}$ samples from code-block $B_i$, into layer l, along with respective auxiliary information to identify the number of samples which have been included for each block and the relevant truncation points. Preferably also, the coding engine uses an algorithm which passes through the code block multiple times for every bit-plane in the magnitude of the samples, starting with the most significant bit and working down to the least significant bit; the truncation points being identified with the completion of each coding pass. For each code-block, $B_i$, the size of the bit-stream, $R_i^n$, at each truncation point, n, and the change in visual distortion, $\Delta D_i^n$, between truncation points n−1 and n are determined and this information is supplied to the convex hull analysis system to determine the set of truncation points, $N_i = \{n_1, n_2, \ldots\}$, which are candidates for the rate-distortion optimisation algorithm, as well as the monotonically decreasing rate-distortion slopes, $S_i^{n_j}$. The coding engine preferably uses the EBCOT algorithm as herein before defined.

In the preferred embodiment, all of the code blocks have roughly the same rectangular size, regardless of the frequency band to which they belong, and this size is approximately in the range 32×32 to 64×64, where the smaller end of this size range is generally preferred. Also, in the preferred embodiment, the block partitioning operation is implemented incrementally, generating new code blocks and sending them to the block coding system as the relevant frequency band samples become available.

In certain embodiments of the invention the method may be applied to colour image compression in an opponent colour representation, in which case distortion from the chrominance channels is scaled differently to the distortion from the luminance channels prior to the application of the rate-distortion optimisation procedure. In such embodiments, the distortion measure is preferably modified to account for masking of chrominance artefacts by activity in the luminance channel. Preferably also, the distortion measure is modified to account for cross-channel masking between chrominance channels in these embodiments.

According to a second aspect the present invention consists in a method of decompressing a digital image from a compressed bit stream created by the method set out above, the decompression method including the steps of:

a) Unpacking the layered compressed bit-stream to recover the truncated embedded bit-streams corresponding to each code-block.
  b) Decoding and assembling the code-blocks into a set of frequency bands.
  c) Synthesising a reconstructed image from the frequency bands through the inverse transform.

Preferably in the decoding method, the blocks are decoded on demand, as the relevant frequency band samples are requested by the inverse transform. Preferably also, the synthesis operation proceeds incrementally, requesting frequency samples and using them to synthesise new image samples, as those image samples are requested by the application.

In various embodiments of the invention, the transform may be a Wavelet transform a Wavelet packet transform, a Discrete Cosine Transform, or any number of other space-frequency transforms which will be familiar to those skilled in the art. In the preferred embodiment of the invention, a Wavelet transform is used, having the well-known Mallat decomposition structure. Also, in the preferred embodiment, the transform is implemented incrementally, producing new frequency band samples whenever new image samples become available, so as to minimise the amount of image or frequency band samples which must be buffered in working memory. Either or both systems may be physically implemented either in hardware or as a general purpose processor executing software instructions.

BRIEF DESCRIPTION OF THE DRAWING

Embodiments of the invention will now be described with reference to the accompanying FIG. 1, which is a block diagram of an image compression and decompression system.

DETAILED DESCRIPTION OF THE INVENTION

Figure 1:
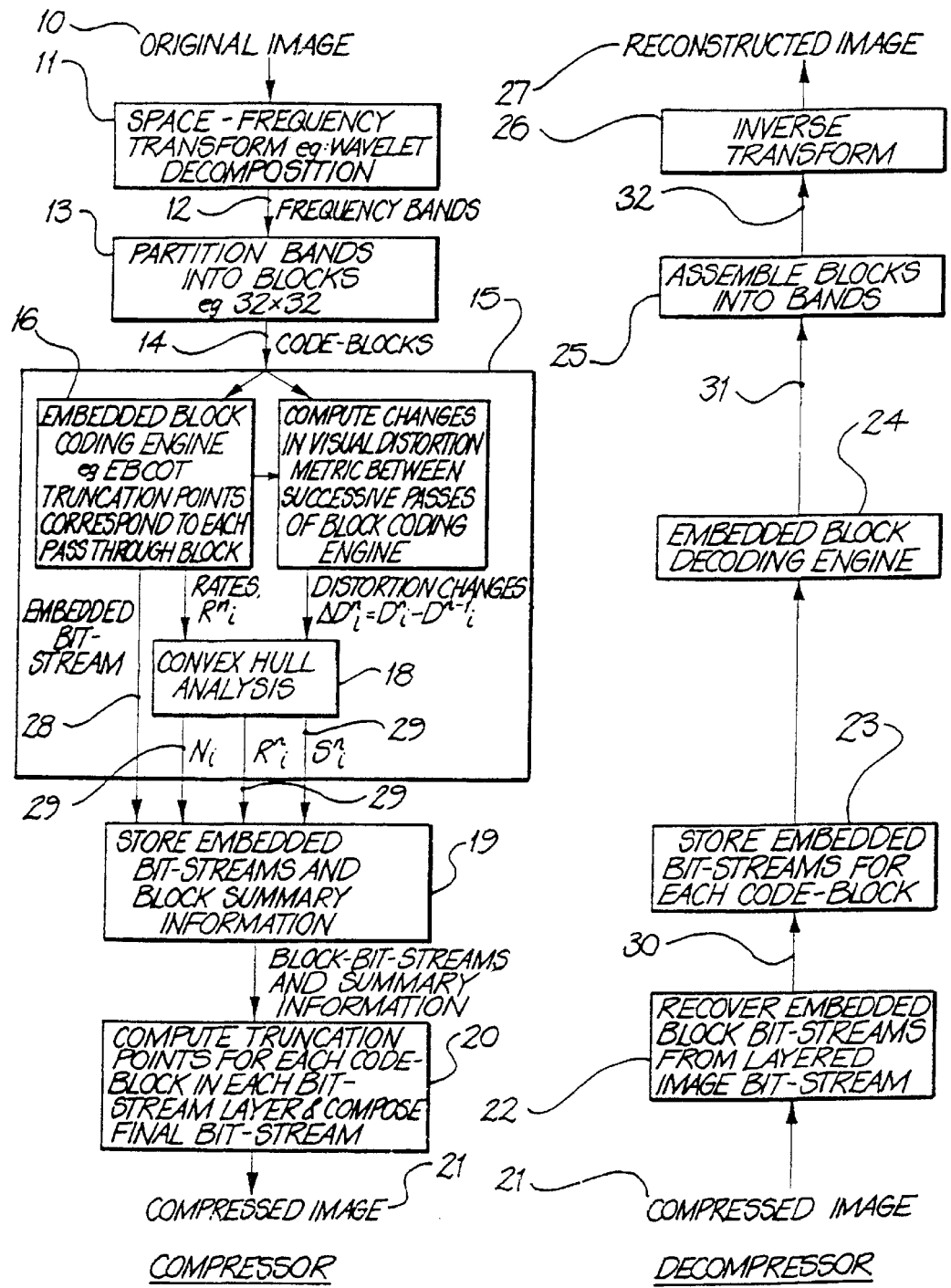

Referring to FIG. 1, the specific visual distortion measure which is to be used in the context of 0, will now be described along with approximations and techniques for efficient implementation of a visual distortion measure which is able to effectively exploit visual masking phenomena when used in conjunction with the rate-distortion optimisation methods outlined in the Background discussion above.

In FIG. 1, flow charts are illustrated for Compression and Decompression steps when making use of an embodiment of the present invention, In summary, the comparison process includes:

a) Taking the unoriginal image 10 and performing a space frequency transform 11 such as a wavelet decomposition to produce a set of frequency bands 12;
  b) performing a partitioning 13 of the frequent bands 12 into code blocks 14;
  c) performing a process 15 on the code blocks 14 using an embedded block coding engine 16 to produce an embedded bit stream 28 and performing computation 17 on changes in visual distortion metric and performing a convex hull analysis 18 to produce block summary information 29;
  d) the embedded bit-streams 28 and block summary information are then stores 19; and
  e) truncation points are computed and a final bit-stream composed 20 to produce the compressed, layered image bitstream 21 as an output of the process.

The decompression process includes:

a) Performing a recovery process 22 on the compressed image 21 from the compression process to recover the embedded block bit-stream from the layered image bit stream;
  b) Storing 23 the embedded bit stream 30 for each code-block;
  c) Passing the embedded bit streams for each code-block through an embedded block decoding engine 24 to produce code blocks 31;
  d) Performing an assembly process 25 to assemble the code-blocks into frequency bands 32; and
  e) Performing an inverse transform 26 on the frequency bands 32 to produce the reconstructed image 27.

The details of these processes will be expanded upon in the following detailed description.

The innovative aspect of the present invention is the way in which the distortion changes, $\Delta D_i^n$, are computed in FIG. 1. Specifically, the innovative aspect involves the exploitation of visual masking properties of the HVS to improve compression performance. The invention is enabled by the following four key observations:

1) Most of the benefit which can be achieved by exploiting HVS characteristics within the context of embedded block coding, is obtained by exploiting intra-band visual masking alone. Moreover, the visual masking phenomenon can be successfully modelled in a manner which is independent of viewing distance. This is of great practical importance, since the viewing distance can rarely be known during compression, which is the point at which the distortion measure underpinning the rate-distortion operation must be chosen. By contrast, previous attempts to exploit HVS properties in scalable image compression systems have focused on the CSF (Contrast Sensitivity Function), which is inherently dependent on assumptions concerning the angle subtended by each reconstructed image pixel at the observer's eye and hence on viewing distance. The experimental work leading to the present invention has shown that the benefits which arise from taking the CSF into account are small by comparison with the benefits which arise from exploiting the visual masking phenomenon and that a successful masking model need not be dependent upon assumptions concerning the viewing distance.

2) The spatial extent of the masking phenomenon is comparable (in a very loose sense) to the size of the code-blocks which can be efficiently coded independently, at least in the most interesting case when the space-frequency transform is a Wavelet transform with the conventional Mallat decomposition structure. This is of the greatest importance because visual masking is a space varying phenomenon which depends strongly upon the local activity in the relevant frequency band, whereas the size of the blocks which can be efficiently independently coded places a limit on the opportunity to track these spatial variations by adjusting the truncation points or each block. The fact that visual masking operates at a significant distance, rather than affecting only immediate neighbours, means that it is a slowly varying function of space which can be effectively tracked within the constraints imposed by code blocks of say 32 by 32 samples each. The physical extent of the masking phenomenon tends to vary in inverse proportion to the spatial frequency associated with the relevant band. The preferred embodiment of the invention involves a conventional multi-resolution Wavelet transform, so that the sampling density for each frequency band also varies in inverse proportion to the spatial frequency of the band, which means that the block size should be chosen to be approximately the same in each band. Experiments with one particular embedded block coding algorithm have shown that good block coding efficiency can be achieved by using code-blocks of 32 by 32 or more samples in every band. Block coding efficiency decreases rapidly as the block size decreases below 32 by 32, but only slowly as the block size increases beyond this. Moreover, as the block size increases, implementation memory requirements grow rapidly and the opportunities to track changes in the masking strength decrease, so a block size on the order of 32 by 32 is recommended for the preferred embodiment of the invention.

3) After some minor approximations, it is possible to implement the masking strength computation very efficiently within the context of embedded block coding, so that the incorporation of these computations into the compression system represents a negligible increase in computation and no increase whatsoever in implementation memory requirements. A discussion of implementation issues may be found in the Detailed Description of the Embodiments which follows.

4) By exploiting visual masking in a computationally and memory efficient manner within the context of embedded block coding, very substantial improvements in visual image quality can be achieved. Equivalently, for the same perceived image quality, the required bit-rate can be substantially reduced by exploiting visual masking. On some images, reductions of a factor of 2 in the bit-rate have been observed. Moreover, these visual benefits apply across a wide range of useful bit-rates and across a range of different resolutions. This is particularly important, since the image compression system under consideration generates scalable bit-streams. Application of the invention has so far been observed only to increase (i.e. never to decrease) overall visual quality, in a range of different images and bit-rates. It should be noted, however, that significant visual gains are observed primarily with large images (say 1K by 1K pixels or more) in which substantial spatial variation in the visual masking effect can be expected.

The advantage of the invention is that perceived image quality may be very substantially improved without significantly affecting implementation memory or computational complexity, or sacrificing any of the other desirable features of embedded block coding systems. Equivalently, the bit-rate required to achieve a given visual image quality may be substantially reduced. Reductions in the required bit-rate of as much as 2:1 have been observed in some images, when compared against the conventional optimisation with respect to MSE, as outlined in the Background discussion above. The visual quality improvements also apply to all of the following:

1) lower resolution images which might be reconstructed from the same bit-stream, after discarding the contributions from higher frequency sub-bands;

2) images reconstructed at a reduced bit-rate after discarding one or more of the trailing bit-stream layers; and 3) smaller image regions reconstructed after discarding the contribution to the bit-stream of those code-blocks which do not affect the spatial region of interest.

Visual Distortion Metric

Following the notation established in the Background discussion above, let $s_i[k]$ denote the sequence of samples in code-block $B_i$, let $\hat{s}_i^n[k]$ denote the representation of these samples which would be reconstructed if the block's embedded bit-stream were truncated to size $R_i^n$, and let $\|w_i\|$ denote the L2-norm of any of the transform basis functions associated with samples in block $B_i$. Then the MSE distortion measure is given by equation 3. The visual distortion measure which has been found to substantially improve visual image quality is $$D_i^n = \|w_i\|^2 \sum_k \left(\frac{\hat{s}_i^n[k] - s_i[k]}{V_i[k]}\right)^2$$

where the "visual masking strength", $V_i[k]$, at sample $s_i[k]$, has the form $$V_i[k] = (\sigma_i)^\rho + \frac{\sum_{k' \in \Phi_i[k]} |s_i[k']|^\rho}{\|\Phi_i[k]\|}$$

Here, $\Phi_i[k]$ denotes a neighbourhood of samples about $s_i[k]$, while $\|\Phi_i[k]\|$ denotes the number of samples in this neighbourhood. $\sigma_i$ is a "visibility floor" which models a soft threshold and/or additive noise in the analogous masking strength "computation" within the Human Visual System (HVS). Although the subscript suggests that $\sigma_i$ might vary on a block-by-block basis, the blocks have no physical analogy in the HVS, so we expect that $\sigma_i$ should depend at most upon the frequency band. It turns out in practice that $\sigma_i$ may be approximated by a constant visibility floor, i.e. $\sigma_i = \sigma, \forall i$, and that visual quality is not a strong function of $\sigma$, provided it is small. In the preferred embodiment of the invention, a typical value for $\sigma$ is $10^{-4}$. In the preferred embodiment of the invention, the neighbourhood, $\Phi_i[k]$, should be reasonably extensive and also independent of the code-block and hence the frequency band which is under consideration. The exact nature of this neighbourhood, however, is described separately below under the heading of Efficient Implementation.

The absolute interpretation of the sample values, $s_i[k']$, which appear equation 6, is important in view of the non-linearity introduced by the exponent, $\rho$. In the context of this discussion, the sample values are to be interpreted relative to a normalisation policy which assigns all samples in all frequency bands a nominal dynamic range of 1. Thus, in the context of a conventional Wavelet transform (the preferred embodiment), the context within which equation 6 is to be interpreted is one in which the image samples are first normalised to a unit nominal range (i.e. the original image samples are all divided by $2^\beta$, where $\beta$ is the original sample bit-depth; in the case of 8-bit images, $\beta=8$.), and the analysis low-pass filters are all normalised to have a unit DC gain, while the analysis high-pass filters are all normalised to have a unit gain at the Nyquist frequency. Bearing in mind that the frequency band samples are generally symmetric about 0 (we will consider the exceptional case of the lowest frequency DC band later), this means that the average in equation 6 is not expected to exceed ½ and will generally be substantially smaller. Under these conditions, and with $\sigma_i$ and $\Phi_i[k]$ both independent of the frequency band under consideration, the formulation in equation 6 can be shown to be independent of any assumptions concerning viewing distance, which is highly desirable in most practical applications.

An obvious generalisation of the neighbourhood averaging in equation 6 would be to form a weighted average, with samples close to $s_i[k]$ weighted more heavily than those further away, with the possibility of incorporating directional sensitivity into the weights. Generalisations of this type, however, would introduce substantial increases in implementation complexity and so they will not be explicitly considered in the present discussion.

Experience shows that the exponent, $\rho$, which appears in equation 6, should be set to about 0.5. The visual masking model embodied by equation 6 is very closely related to those used in the APIC system and in Watson's work, where $\rho=0.6$ and $\rho=0.7$ in those cases, respectively. In the preferred embodiment of the invention, however, $\rho=0.5$ is used. This value has significant computational advantages, since $V_i[k]$ appears in equation 6 through its square. Perhaps even more importantly, the selection of $\rho=0.5$ has been found to yield superior visual image quality, when considered over a range of different images and bit-rates. Larger values of $\rho$ appear to be overly aggressive, particularly at lower bit-rates when distortion is most visible.

All space-frequency transforms generally involve a lowest frequency band, which represents the baseband of the original image spectrum. This frequency band is anomalous in the sense that the average of sample absolute values over a neighbourhood is not a good measure of activity within the neighbourhood, as it is in the other bands. In this special case, equation 6 should be replaced by $$V_i[k] = (\sigma_i)^\rho + \frac{\sum_{k' \in \Phi_i[k]} |s'_i[k']|^\rho}{\|\Phi_i[k]\|}$$

where the samples, $s'_i[k]$, are obtained by high-pass filtering the original sample values, $s_i[k]$, for the band. This is closely related to the visual masking operator that one would obtain by decomposing the lowest frequency band using another space-frequency decomposition and averaging the masking strengths from the bands of this hypothetical decomposition. A suitable high-pass filter might have the following impulse response:

$$0 \quad \tfrac{1}{4} \quad 0$$

-continued $$\tfrac{1}{4} \quad -1 \quad \tfrac{1}{4}$$

$$0 \quad \tfrac{1}{4} \quad 0$$

Efficient Implementation

Intuitively one would expect that the neighbourhoods, $\Phi_i[k]$, should contain all samples from the same frequency band as block $B_i$, which lie within a given distance from the sample, $s_i[k]$. In practice, however, this means that $V_i[k]$ would have to be computed and its reciprocal taken in equation 5, for each separate sample, which would clearly increase the compression system's computation requirements substantially. Division and reciprocal operators are complex to implement and best to avoid or minimise wherever possible, particularly in hardware implementations of the system.

In the preferred embodiment of the invention, each code-block, $B_i$, is partitioned into a collection of sub-blocks, $B_i^j$ and the masking neighbourhood, $\Phi_i[k]$, is set equal to the sub-block, $B_i^{j(k)}$, to which sample $s_i[k]$ belongs. In this case, the masking strength, $V_i[k]$, is identical for all samples in sub-block $B_i^{j(k)}$. Let $V_i^{j(k)}$ denote this constant value. Then equation 5 becomes $$D_i^n = \|w_1\|^2 \sum_j \left( \left(\frac{1}{V_i^j}\right)^2 \sum_{k \in B_i^j} (\hat{s}_i^n[k] - s_i[k])^2 \right)$$

Thus, the only increase in complexity over the simple case of MSE is due to the fact that the value of $(1/V_i^j)^2$ must be computed for each sub-block and multiplied by the MSE computed for that sub-block. The exponentiation of each sample's magnitude by $\rho$, in equation 6, may be implemented with the aid of a small lookup table in some embodiments, since most of the relevant information is captured by the position of the most significant bit and a few additional less significant bits in the binary representation of the sample magnitudes. This implementation strategy is rendered particularly economical by the fact that typical implementations of the embedded block coding engine inherently discover the index of the most significant bit in the binary representation of each sample's magnitude.

In some embodiments, the complexity of the computation of $V_i^j$ may be simplified, at the expense of some accuracy in modelling the HVS, by moving the exponentiation by $\rho$ outside the summation, to obtain $$V_i^j \approx \left( \sigma_i + \frac{\sum_{k' \in \Phi_i^j} |s_i[k']|}{\|\Phi_i^j\|} \right)^\rho$$

In the extreme case when the code-block contains only a single sub-block and the above non-ideal approximation is made, the complexity may be even further reduced in some particular embodiments. In particular, when the preferred value of $\rho=0.5$ is adopted, as explained above, the distortion for block $B_i$ corresponding to truncation point n, is given by $$D_i^n = \frac{\|w_i\|^2 \sum_k (\hat{s}_i^n[k] - s_i[k])^2}{(V_i)^2} = \frac{\|w_i\|^2 \sum_k (\hat{s}_i^n[k] - s_i[k])^2}{\sigma_i + \frac{\sum_k |s_i[k]|}{\|B_i\|}}$$

The division by the number of elements in the block, i.e. $\|B_i\|$ is trivial if the block size is a power of 2, which is certainly the case in the preferred embodiment of the invention. Moreover, the remaining division by the value of $(V_i)^2$ may be folded into the computation of the rate-distortion slopes, which is described in the Background discussion above. In this case, then, the complexity of the visual distortion metric is essentially identical to an VISE computation. In the preferred embodiment of the invention, however, smaller sub-blocks of size 8×8 have been found to yield the best results and the approximation of equation 6 by equation 9 is preferably avoided.

A close examination of the rate-distortion optimisation steps outlined in the Background discussion, should confirm that the distortion, $D_i^n$, is not used directly; only differences of the form $D_i^{n_1} - D_i^{n_2}$ are of any significance, where $n_1$ and $n_2$ are two different truncation points. In the preferred embodiment of the invention, the difference between the distortion values for each pair of successive truncation points is computed directly from $$\Delta D_i^n = D_i^{n-1} - D_i^n = \qquad (11)$$

$$\|w_i\|^2 \sum_j \left( \left(\frac{1}{V_i^j}\right)^2 \sum_{k \in B_i^j} [(\hat{s}_i^{n-1}[k] - s_i[k])^2 - (\hat{s}_i^n[k] - s_i[k])^2] \right)$$

Although seemingly complex, this computation requires remarkably little computational effort for two reasons. Firstly, in the fine embeddings which are relevant to the invention, each new truncation point represents changes in only a fraction of the samples in the code-block, so that the MSE reduction need be computed only for those samples. Secondly, in the specific case of the EBCOT embedded block coding engine and other related coders, the MSE reduction for those samples which are affected by a particular coding pass may be well approximated with the aid of a very small lookup table and simple integer arithmetic, as carefully explained in the EBCOT document.

Generalisations

Although it is clearly preferable to avoid any dependence on assumptions concerning the viewing-distance, there are applications where such assumptions can be made with some degree of confidence. For this reason, the possibility of augmenting the visual masking formulation expressed above to account for variations in the Contrast Sensitivity Function (CSF) between frequency bands, is by no means excluded. This amounts to simply scaling all the distortion estimates, $D_i^n$, for code-blocks in a given frequency band, by a constant factor, where the means for determining these factors is described elsewhere in the literature and is not the subject of this present document.

In the same way, the HVS model used to determine $D_i^n$ may be augmented by the inclusion of inter-band masking effects, rather than just intra-band masking, and also by the inclusion of local luminance adaptation effects. These phenomena have all been considered in a different context within the APIC system and by Watson. In practice, luminance adaptation effects are partially compensated by the gamma function used in the representation of most images to which the image compression system described here is expected to be applied. Also, inter-band masking tends to be a much weaker phenomenon than intra-band masking. As a result, it is not clear whether the additional computational and memory costs associated with attempts to exploit these phenomena are justified in practical applications. Nevertheless, the possibility that they would be used to enhance the performance of the intra-band masking formulation described in this document is by no means excluded.

In some applications, it might be desirable to replace the squared error computation in equation 8 by an absolute error computation of the form:

$$D_i^n = \|w_i\|^2 \sum_j \left( \left(\frac{1}{V_i^j}\right)^2 \sum_{k \in B_i^j} |\hat{s}_i^n[k] - s_i[k]| \right)^2$$

Modifications of this form might be considered for the sake of computational complexity, with relatively little affect on visual image distortion.

When colour images are to be compressed, the visual masking formulation described above may be applied to all three colour channels and the rate-distortion optimisation methods discussed in the Back-round description above may then be applied jointly to all code-blocks representing the image. Better results may be obtained, however, if the distortions (or equivalently, the rate-distortion slopes) associated with the code blocks from each colour channel are first scaled by an amount which reflects the visual importance of that channel. For example, an opponent colour space such as YUV, YIQ or Lab is commonly used for colour image compression and the luminance channel in any of these representations generally has greater visual significance than the chrominance channels. Inter-channel masking is probably not insubstantial so that the visibility of chrominance distortion is affected by activity in the same frequency band of the luminance channel. With some small increase in computational and memory resources, these effects may be accommodated within the visual distortion estimates, $D_i^n$. Specifically, for chrominance component code-blocks, equation 8 may be replaced by $$D_i^n = \|w_i\|^2 \sum_j \left( \frac{1}{(V_i^j)^2 + \alpha(V_{y(i)}^j)^2} \sum_{k \in B_i^j} \hat{s}_i^n[k] - s_i[k] \right)^2$$

where $B_{y(i)}^j$ denotes the luminance sub-block whose location and frequency band correspond to the chrominance sub-block, $B_i^j$. The parameter $\alpha$ is then determined to maximise perceived visual quality over a wide range of colour images and bit-rates. Extensions to include cross-channel masking between the chrominance channels are straightforward, but with diminishing return.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method of compressing a digital image to produce a scalable bit stream having a plurality of quality layers, the method including the steps of:

a) decomposing the image into a set of distinct frequency bands using a space frequency transform;

b) partitioning the samples in each frequency band into code blocks;

c) for each code-block, generating an embedded bit-stream to represent the contents of the respective code block;

d) determining a rate-distortion optimal set of truncation points, $n_i^l$ for each code-block, $B_i$, and each quality layer, l, subject to a constraint on the overall bit-rate or distortion for the layer in a manner which is sensitive to the masking property of the Human Visual System (HVS); and e) storing the embedded bit-streams for each code-block.

2. The method as claimed in claim 1, wherein the code block truncation points are selected according to a rate-distortion optimisation criterion, using a distortion measure which is sensitive to masking in the HVS.

3. The method as claimed in claim 2, wherein contributions to the distortion measure from each sample in a code block are weighted as a function of a neighbourhood of samples surrounding the respective sample.

4. The method as claimed in claim 3, wherein the weighting function is a function of the magnitudes of the samples in the respective neighbourhood of samples.

5. The method as claimed in claim 3, wherein the weighting function is held constant over a sub-block of samples.

6. The method as claimed in claim 5, wherein the sub-block of samples has dimensions no larger than the full size of the respective code block.

7. The method as claimed in claim 5, wherein the weighting function is a function of the magnitude of samples taken only from within the sub-block of samples.

8. The method as claimed in claim 2, wherein the distortion measure is a weighted sum of the squared errors taken at each sample.

9. The method as claimed in claim 2, wherein the method is applied to colour image compression in an opponent colour representation, and wherein distortion from the chrominance channels is scaled differently to the distortion from the luminance channels prior to the application of the rate-distortion optimisation procedure.

10. The method as claimed in claim 9, wherein the distortion measure is modified to account for masking of chrominance artefacts by activity in the luminance channel.

11. The method as claimed in claim 10, wherein the distortion measure is modified to account for cross-channel masking.

12. The method as claimed in claim 1, wherein the method is performed by a coding engine using an algorithm which passes through the block multiple times for every bit-plane in the magnitude of the samples, starting with the most significant bit and working down to the least significant bit, the truncation points being identified with the completion of each coding pass.

13. The method as claimed in claim 12, wherein, for each code-block, $B_i$, the size of the bit-stream, $R_i^n$, at each truncation point, n, and the change in visual distortion, $\Delta D_i^n$, between truncation points n−1 and n are determined and this information is supplied to a convex hull analysis system, which determines the set of truncation points, $N_i=\{n_1,n_2,\ldots\}$, which are candidates for the rate-distortion optimisation algorithm, as well as respective monotonically decreasing rate-distortion slopes $S_i^{n_j}$.

14. The method as claimed in claim 13, wherein summary information, $N_i$, $R_i^n$ and $S_i^n$, is stored along with the embedded bit streams for each code block, the storing process taking place until sufficient information has been stored to enable truncation points to be determined for each code-block.

15. The method as claimed in claim 14, wherein the summary information is saved until all code-blocks in the image have been compressed.

16. The method as claimed in claim 15, wherein a truncation decision is made before all code-blocks in the image have been compressed, and the summary information is saved only for those code blocks for which truncation have not yet been made.

17. The method as claimed in claim 14, wherein the rate-distortion optimal set of truncation points $n_i^l$ are determined for each code block with a plurality of layers, each layer targeted to a distinct bit-rate or distortion level, with each layer targeting successively higher image quality such that for each layer l there are $n_i^{l} \geq n_i^{l-1}$ truncation points, and the final scalable image bit-stream is formed by including $R_i^{n_i l} - R_i^{n_i l-1}$, samples from code-block $B_i$ into layer l, along with respective auxiliary information to identify the number of samples which have been included for each block and the relevant truncation points.

18. The method as claimed in claim 13, wherein the coding engine uses an algorithm which passes through the code block multiple times for every bit-plane in the magnitude of the samples, starting with the most significant bit and working down to the least significant bit; the truncation points being identified with the completion of each coding pass.

19. The method as claimed in claim 18, wherein, for each code-block, $B_i$, the size of the bit-stream, $R_i^n$, at each truncation point, n, and the change in visual distortion, $\Delta D_i^n$, between truncation points n−1 and n are determined and this information is supplied to the convex hull analysis system to determine the set of truncation points, $N_i=\{n_1,n_2,\ldots\}$, which are candidates for the rate-distortion optimisation algorithm, as well as the monotonically decreasing rate-distortion slopes, $S_i^{n_j}$.

20. The method as claimed in claim 18, wherein the coding engine uses the EBCOT algorithm as herein before defined.

21. The method as claimed in claim 1, wherein all of the code blocks have substantially the same size, independently of the frequency band to which they belong.

22. The method as claimed in claim 21, wherein the size of the code blocks is substantially in the range 32×32 to 64×64.

23. The method as claimed in claim 1, wherein the block partitioning operation is implemented incrementally, generating new code blocks and sending them to the block coding system as the relevant frequency band samples become available.

24. The method as claimed in claim 1, wherein the space frequency domain transform is one selected from a Wavelet transform, a Wavelet packet transform, a Discrete Cosine transform, or a Fourier transform.

25. The method as claimed in claim 1, wherein a Wavelet transform is used, having a Mallat decomposition structure.

26. The method as claimed in claim 1, wherein the transform is implemented incrementally, producing new frequency band samples whenever new image samples become available to minimise the quantity of image or frequency band samples which must be buffered in working memory.

27. A method of decompressing a digital image from a compressed bit stream created by the method as claimed in claim 1, the decompression method including the steps of:

unpacking the layered compressed bit-stream to recover the truncated embedded bit-streams corresponding to each code-block;

decoding and assembling the code-blocks into a set of frequency bands; and synthesising a reconstructed image from the frequency bands through the inverse transform.

28. The method as claimed in claim 27, wherein the blocks are decoded on demand, as the relevant frequency band samples are requested by the inverse transform.

29. The method as claimed in claim 27, wherein the synthesis operation proceeds incrementally, requesting frequency samples and using them to synthesise new image samples, as those image samples are requested by the application.

* * * * *

UNITED STATES PATENT AND TRADEMARK OFFICE
CERTIFICATE OF CORRECTION

PATENT NO. : 6,760,482 B1
DATED : July 6, 2004
INVENTOR(S) : Taubman

It is certified that error appears in the above-identified patent and that said Letters Patent is hereby corrected as shown below:

<u>Column 16,</u>
Line 14, please replace the equation with:

$$n_i^l \geq n_i^{l-1}$$

Signed and Sealed this

Twenty-fifth Day of January, 2005

JON W. DUDAS
*Director of the United States Patent and Trademark Office*